Dec. 8, 1925.
J. H. BOURGON
1,564,929
HOOD SUPPORT
Filed July 18, 1924
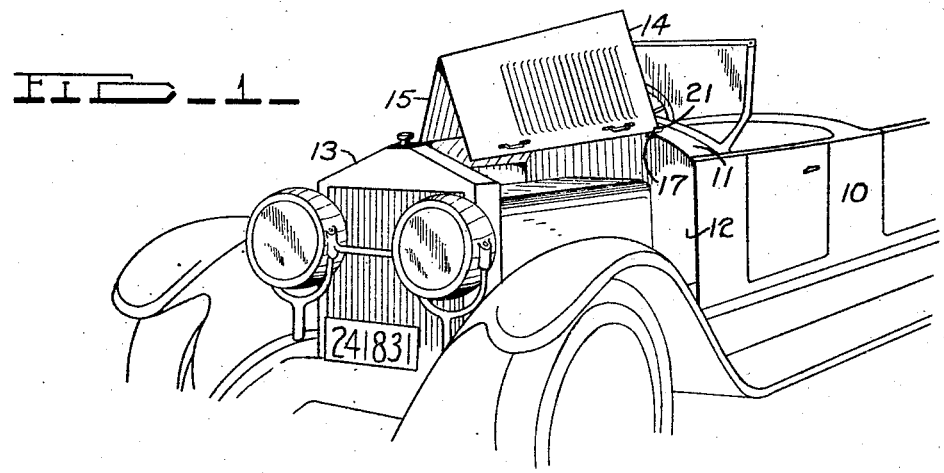
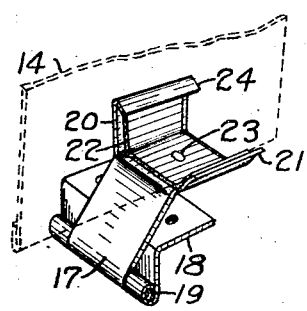
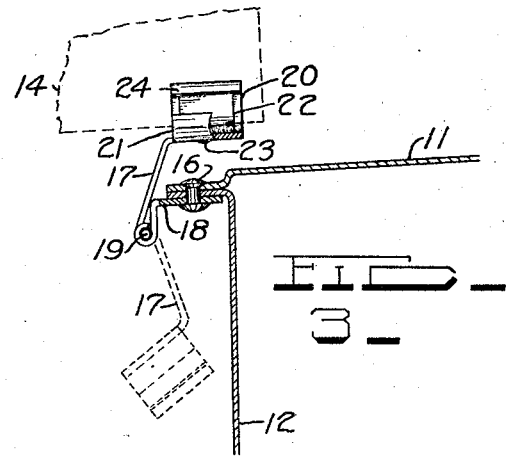
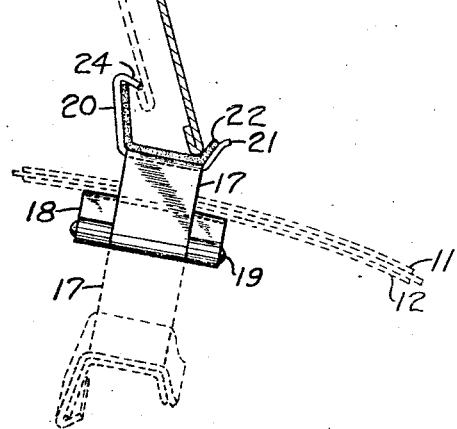
INVENTOR.
JOSEPH H. BOURGON
BY
ATTORNEYS.

Patented Dec. 8, 1925.

1,564,929

UNITED STATES PATENT OFFICE.

JOSEPH H. BOURGON, OF DETROIT, MICHIGAN, ASSIGNOR TO THE STUDEBAKER CORPORATION, OF SOUTH BEND, INDIANA, A CORPORATION OF NEW JERSEY.

HOOD SUPPORT.

Application filed July 18, 1924. Serial No. 726,872.

*To all whom it may concern:*

Be it known that I, JOSEPH H. BOURGON, a subject of George V, King of Great Britain and Ireland, and resident of Detroit, in the county of Wayne and State of Michigan, have invented certain new and useful Improvements in Hood Supports, of which the following is a specification.

This invention relates to automobiles and particularly to means for holding the hoods of such automobiles in raised position.

It is an object of this invention to provide a hood support for an automobile that will hold the hood in raised position without danger of marring or scratching the same or marring or scratching any other part of the automobile body.

It is another object of this invention to provide a hood support for an automobile which will hold the hood above and completely out of contact with the cowl when the hood is in raised position.

Another object is to provide a support for a raised automobile hood which normally lies under the hood but which can be folded up above the upper edge of the cowl when in position to receive a raised hood.

A further object is to provide a support for a raised automobile hood constructed and positioned to prevent one side of the hood from folding over the center of the hood and resting on the other side.

A still further object is to provide a support for holding the hood of an automobile in raised position, which support comprises two parts hinged together, one of which is secured to the automobile dash or cowl and both of which are normally under and concealed by the hood, the other of which may be pivoted so as to bring its upper end, which is trough shaped and lined with a suitable material, to a position above the cowl where it may receive the lower edge of the side panel of the hood and hold it in such position against movement either to or from the center of the hood.

The above being among the objects of the present invention the same consists of certain features of construction and combination of parts to be hereinafter described with reference to the accompanying drawing and then claimed, having the above and other objects in view.

In the accompanying drawing which illustrates a suitable embodiment of the present invention and in which like numerals refer to like parts throughout the several different views, Figure I is a perspective view of an automobile showing the left hand side of the hood in raised position and held in such position by a support embodying the present invention.

Figure II is a perspective view of the left hand hood support shown in operative or hood engaging position, the relative position of the hood being shown by dotted lines.

Figure III is a side view of the left hand hood support shown in operative position and attached to the automobile dash which is shown in section, the relative position of the support when folded or in inoperative position being shown by dotted lines.

Figure IV is a view from the front of the car of the left hand hood support shown in operative position, and by dotted lines in inoperative position, the hood being shown in two different positions, one by full lines and one by dotted lines, and the relative position of the dash and cowl being shown by dotted lines.

The problem of holding automobile hoods in open or raised position is one which has caused great inconvenience to automobile owners. As a rule no support is provided at all and the automobile owner or other person working on the car is forced to either fold the one side of the hood over onto the other side of the hood or rest the rear edge of the hood on the cowl, either of which methods tends to mar or scratch the finish of the different parts and the latter of which gives such an uncertain support that the hood may flap one way or the other with the slightest vibration or movement of the automobile. In cases where supports are provided, they are of a permanent or immovable type which are secured to the rear face of the radiator so as to be concealed when the hood is closed, this being possible due to the fact that the hood increases in width from front to rear and the lower edge of the hood side panels move rearwardly when the hood is raised to open position. Such supports have not been found satisfactory inasmuch as the ovehanging end of the hood is the heaviest and tends to twist the hood out of shape and also an inadvertent push on the same may cause it to pull out of the support and fall over on the other side of the hood.

The present invention contemplates a hood support which will eliminate the above mentioned difficulties and in the accompanying drawing which illustrates a suitable embodiment of the same, an automobile is shown which comprises a body 10 provided with a cowl 11, dash 12, radiator 13, and a hood, each side of which consists of a side panel 14 hingedly connected to a top panel 15 which in turn is hinged to the corresponding top panel on the other side of the automobile. As in the conventional constructions the width of the hood increases from front to rear so that when the hood is raised to the position shown in Figure I the lower edge of the side panel 14 moves rearwardly and projects over the cowl 11. The dash 12 is provided with a forwardly projecting flanged edge which is secured to the forward edge of the cowl 11 by any suitable means such as riveting or welding and it is to this forwardly extending flange a short distance from the center-line of the automobile that the embodiment of the present invention shown in the drawing is secured by rivets 16. The embodiment shown is constructed mainly of sheet metal and consists of the support member 17 hinged to the butt-plate member 18. The butt-plate member 18 is L shaped, the leg of the L being secured to the forwardly flanged edge of the dash by the rivets 16 and the foot of the L projects downwardly and terminates in a rolled eye. The center portion of the foot of the L adjacent to and including that part of the eye is cut out to receive a like eye which is rolled in one end of the support member 17, and a pin 19 passes through both eyes and pivotally connects both parts together. The end of the support member 17 opposite the eye end is bent over so that it lies parallel to the lower edge of the hood panel 14 and above the cowl 11 when the hood is raised and when the support is raised or swung up and rests against the bend in the butt-plate at the point of juncture between the leg and foot of the L. Projecting outwardly and upwardly from this bent end are the projecting portions 20 and 21 which form a trough for the lower edge of the hood panel 14 to rest in. The interior of this trough is provided with a leather or fabric strip 22 secured in place by the rivet 23 preferably sunk beneath its surface, and acts as a seat for the lower edge of the hood side panel 14 without any danger of scratching the finish thereof. The hood side panel 14 normally rests in the trough as shown in full lines in Figure IV. The upper edge of the projecting portion 20 which is towards the center of the automobile is bent over towards the center of the trough or outwardly and downwardly from the center of the automobile and provides a catch 24 for the reversely bent lower edge of the hood side panel 14. This catch 24 engages the reversely bent lower edge of the hood side panel 14 and prevents movement thereof when from the application of pressure or for some other reason the hood tends to move further towards the center of the automobile which has the effect of drawing the lower edge of the hood side panel 14 out of the trough shaped end of the support member 17 and allow the one side of the hood to fall over on the other side. As previously noted the conventional hood supports have no means to prevent such movement of the hood.

As shown particularly in Figures III and IV, when the hood is in its normal or closed position the support member 17 is turned downwardly as shown in dotted lines to lie beneath the hood and be concealed thereby, and when it is desired to raise the hood and hold it in raised position the member 17 is swung about the pin 19 to the position shown in full lines. In the construction shown it is preferable to rivet over the ends of the pin 19 sufficiently to make the support member 17 move rather stiffly about the pin 19 so that there will be no liability of its vibrating or rattling when the hood is closed and the car running, although other means such as conventional forms of spring devices may be utilized for the same purpose.

Although the drawing shows a particular form of dash 12 and method of attachment to the cowl 11 it will be understood that the member 18 may be changed in form and construction to meet any form of dash or cowl that may be met with, or if desired it may be readily changed to also support the front end of the hood either solely or in combination with the rear one shown.

Formal changes may also be made in the specific embodiment of the invention described without departing from the spirit or substance of the broad invention, the scope of which is commensurate with the appended claims.

What I claim is:

1. In combination with an automobile having a hood provided with an inwardly turned lower edge, a support to receive the lower edge of said hood when in raised position, said support comprising a substantially flat portion and projections extending upwardly therefrom, one of said projections having an inturned edge to engage the lower turned edge of said hood to prevent the same from moving out of said support and further toward the center line of said automobile.

2. In combination with an automobile having a hood, a cowl, and a dash, of a plate secured to said dash and having a downwardly depending portion, a member pivoted to said downwardly depending portion of said plate and abutting against the same when said member is in operative position, said member having an offset portion forming a support for said hood, projections at the sides of said offset portion, and an inturned edge on one of said projections adapted to engage said hood and prevent its being moved from said support further toward the center line of said automobile.

Signed by me at Detroit, Michigan, U. S. A., this 15th day of July, 1924.

JOSEPH H. BOURGON.